Patented June 8, 1948

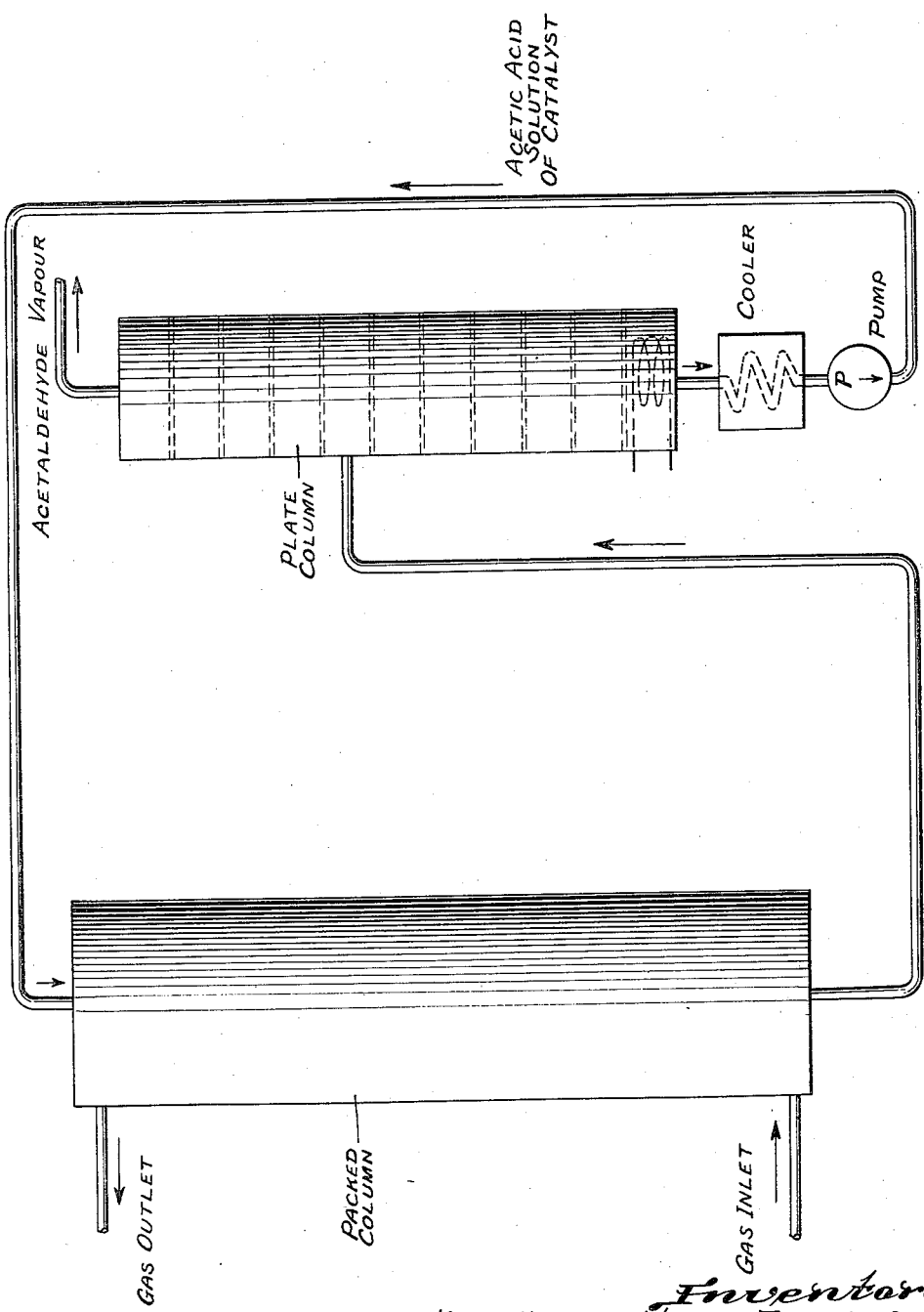

2,442,942

UNITED STATES PATENT OFFICE 2,442,942

RECOVERY OF ACETALDEHYDE FROM GASEOUS MIXTURES CONTAINING THE SAME

Karl Heinrich Walter Tuerck, Banstead, and Eric Harvey Brittain, Epsom Downs, England, assignors to The Distillers Company Limited, Edinburgh, Scotland, a British company Application January 7, 1943, Serial No. 471,612
In Great Britain September 11, 1941

Section 1, Public Law 690, August 8, 1946
Patent expires September 11, 1961

9 Claims. (Cl. 260—340)

This invention is for improvements in or relating to the recovery of acetaldehyde from gaseous mixtures and has for an object to overcome the difficulties which are experienced in the recovery of acetaldehyde owing to its low boiling point and high volatility.

In cases where acetaldehyde vapour has to be recovered from gaseous mixtures by absorption, as for example in the hydration of acetylene, the dehydrogenation of alcohol or the oxidation of acetaldehyde to acetic acid (and/or acetic anhydride), the use of large scrubbing units and large amounts of scrubbing liquid, which is necessary in view of the high vapour pressure of acetaldehyde, involves a considerable loss of acetaldehyde during the recovery, apart from the disadvantages of handling and distilling large amounts of scrubbing liquids. Organic solvents offer the advantage of recovering the aldehyde in a more or less water-free medium, but as scrubbing liquids they are less efficient than water, in which acetaldehyde exerts a relatively small vapor pressure at low concentrations.

It is an object of the present invention to increase the efficiency of organic scrubbing liquids for acetaldehyde and to increase the content of aldehyde in the scrubbing liquid leaving the scrubbing system.

According to the present invention a process for the recovery of acetaldehyde from gaseous mixtures containing it comprises bringing the said gaseous mixture into contact with an inert organic liquid which is a solvent for acetaldehyde and for paraldehyde, in all proportions, and which contains an acidic polymerising agent capable of converting the acetaldehyde to paraldehyde. It will be appreciated that owing to the very much higher boiling point of paraldehyde as compared with acetaldehyde and the lower volatility of paraldehyde as compared with acetaldehyde, the size of the scrubbing unit can be very much reduced in comparison with the conventional scrubbing units in which acetaldehyde is merely dissolved in the scrubbing liquid and furthermore that the amount of the scrubbing liquid can be much reduced. As inert solvents we include those organic substances which do not react with acetaldehyde under the conditions of the absorption, which do not neutralise the polymerisation catalyst and which do not resinify in the presence of the small amounts of catalyst used.

Acetic acid and paraldehyde are specially suitable for this purpose. At small aldehyde concentrations, solvents of low molecular weight influence the equilibrium ratio between acetaldehyde and paraldehyde in favour of acetaldehyde. We therefore prefer to use solvents of a molecular weight higher than 60, especially if the gases to be washed contain relatively small amounts, e. g., less than 200 g. acetaldehyde/m.$^3$. Chlorinated hydrocarbons such as carbon tetrachloride and trichlorethylene are suitable solvents for this purpose. Substances which are suitable as acidic polymerizing catalysts are strong acids such as sulphuric acid, phosphoric acid, organic sulphonic acids such as p-toluenesulphonic acid and acidic salts such as zinc chloride.

It has already been proposed in prior British Patent No. 132,529 to pass a gaseous mixture containing acetaldehyde over aqueous sulphuric acid whereby the acetaldehyde was converted into paraldehyde which floats on the surface of the aqueous sulphuric acid solution. The process, however, produces a heterogeneous mixture from which the paraldehyde has to be recovered by decantation processes, whereas the process of the present invention produces a homogeneous solution of paraldehyde in the solvent used.

Moreover, we have found that the rate of polymerisation of acetaldehyde to paraldehyde according to the present invention is many times greater than that obtained by the use of aqueous solutions of sulphuric acid and the rate in the latter process is so slow as to be of no technical value.

For example, we have found that if acetaldehyde is dissolved to form a 35.8% solution by weight in (a) 0.4% aqueous sulphuric acid, (b) 10% aqueous sulphuric acid, or (c) acetic acid containing 0.4% sulphuric acid, the amount of acetaldehyde polymerised to paraldehyde is (a) nil in 30 minutes, and 50% in 32 hours, (b) 8% in 30 minutes and 58% in 24 hours, (c) 80% in the first minute.

A feature of the invention consists in that the amount of the acidic polymerising agent used in the solvent is of the order of 1% by weight or less; an amount of as little as 0.01% by weight or even less can successfully be used whilst where the said polymerising agent is a strong inorganic acid the amount thereof is preferably always less than 0.5% by weight. If acetic acid is used as the solvent, e. g., in quantities of more than 50%, 0.01% or even less of the above-mentioned catalysts are sufficient.

In view of the fact that it is known that strong acids are not only strong polymerising catalysts but also strong condensation catalysts for acetaldehyde, it is surprising that under the conditions of the process according to the invention the solutions obtained are practically free from condensation products of acetaldehyde.

The process of the present invention is of very wide application in commerce. For example, the process may be applied to the recovery of acetaldehyde vapours from processes in which acetaldehyde is oxidised to form acetic acid with or without acetic anhydride, whilst it may also be utilised for the preparation of pure acetaldehyde vapours since the paraldehyde can be purified and then depolymerised to produce pure acetaldehyde vapours.

It is an advantage of the process of the invention that it provides scrubbing liquids which have little or no corrosive action upon the usual materials of plant construction, e. g., aluminium. The small amounts of acidic catalysts which are necessary in accordance with the invention do not substantially corrode the plant, whereas aqueous solutions of such catalysts on the other hand exert a pronounced corrosive action on the plant. The absorption may be carried out in the usual scrubbing units. We prefer to use a scrubbing device which enables the gas and the liquid to flow in counter-current to each other.

In order to obtain the maximum efficiency it is advisable to employ a time of contact between gas and liquid sufficient to polymerize most of the acetaldehyde in the gas mixture under treatment. Generally speaking, from 30 to 60 seconds contact has been found to be satisfactory.

A preferred method of carrying out the invention is to recycle the scrubbing liquid. Thus, for example, the liquid running off at the bottom of the scrubbing tower is collected in a tank, in order to allow sufficient time for completing the polymerisation of the absorbed acetaldehyde, and the liquid is then partly returned to the scrubbing column at a suitable point preferably slightly above the centre of the column, while fresh solvent with or without a polymerising catalyst is introduced at the top of the column.

Suitable temperatures for the absorption are 5–25° C.; we prefer to carry out the absorption at 15–20° C. The temperature may be regulated by cooling the scrubbing towers indirectly or, if the quantity of scrubbing liquid is sufficient, by cooling the latter before it enters the scrubbing tower.

The process of the invention is particularly suitable for use in conjunction with acetaldehyde oxidations. These oxidation processes generally utilise a gaseous mixture of acetaldehyde vapour in an oxygen-containing gas which gaseous mixture is passed into acetic acid contained in the reaction vessel and maintained at a temperature from 40° to 100° C. whereby a portion of the acetaldehyde is oxidised to acetic acid.

The unoxidised portion of the acetaldehyde feed is recovered by the process of the invention to yield a solution of paraldehyde in a solvent which also contains a small amount of the polymerising agent.

As the polymerisation of acetaldehyde to paraldehyde is a reversible reaction, it will readily be understood that the paraldehyde solvent if maintained at a low temperature, of the order of 20° C., will absorb acetaldehyde and convert it to paraldehyde which at that temperature remains dissolved in the solvent.

The solution when heated will evolve acetaldehyde vapour as the higher temperature favours the reverse reaction, namely the depolymerisation of paraldehyde to acetaldehyde.

Thus it will be appreciated that the scrubbing liquor from the scrubbing unit can be passed to a vessel in which it is heated to evolve acetaldehyde vapours which vapours can be admixed with the fresh feed of acetaldehyde to the reaction vessel. Acetic acid is a convenient solvent which may be used and this is advantageous also since the scrubbing liquor may be a part of the reaction liquid in the reaction vessel which is withdrawn from the reaction vessel, cooled and passed to the scrubbing unit from which it is recirculated back to the reaction vessel. It is also possible to carry out the process by returning the scrubbing liquid issuing from the scrubbing column directly to the top of the scrubbing column for treating a further quantity of acetaldehyde containing gas. This is due to the fact that it has been found that the efficiency of the scrubbing liquid is maintained over long periods of use so that it does not require to be renewed frequently as is the case with conventional scrubbing solvents.

The above mentioned procedures are particularly adaptable for processes for the production of acetic acid or acetic anhydride utilising paraldehyde as the source of acetaldehyde. In such a process paraldehyde may be fed into the reaction vessel in admixture with a small quantity of a depolymerising agent and an oxygen-containing gas is then introduced into the reaction vessel whereby oxidation is caused.

Alternatively, in any of the foregoing processes the acetaldehyde vapours can be recovered in the scrubbing unit in the form of paraldehyde in a solvent, which is circulated in a closed circuit as between the scrubbing unit and an acetaldehyde regenerating unit, and which does not enter the reaction vessel. Thus it is possible to avoid any corrosion of the reaction vessel which might be caused by contact of the acidic polymerising or depolymerising agents with the material of the reaction vessel at the elevated temperature of reaction.

The scrubbing solutions which are obtained according to the process of the invention contain paraldehyde together with small amounts of acetaldehyde. If paraldehyde is used as the solvent, the scrubbing product is paraldehyde containing only acetaldehyde and the acidic polymerising agent. By distilling, pure acetaldehyde can be easily obtained.

By neutralising the polymerisation catalyst in the usual way, e. g., with salts of fatty acids, the solutions can be worked up for paraldehyde.

The solutions themselves are convenient means of storing the recovered acetaldehyde, which otherwise has to be kept under pressure or in specially cooled tanks.

It is, however, a special feature of our invention to use the solutions obtained according to our process as raw material in operations where acetaldehyde is reacted in an essentially water-free phase, e. g., in the manufacture of acetic acid and/or acetic anhydride by reacting acetaldehyde in the liquid phase with gaseous oxygen. The solutions, especially those which contain only paraldehyde and no other solvent, can conveniently be used to produce gaseous mixtures containing acetaldehyde, e. g., acetaldehyde-air mixtures for the production of acetic acid, by passing a current of air through the solutions at a given temperature at which the solution develops the desired acetaldehyde vapour pressure, and leading the resulting gas-mixture into the oxidation vessel.

The following examples illustrate the manner in which the invention may be carried into effect:

*Example 1.*—The reaction gases obtained from the catalytic dehydrogenation of ethanol, after having passed through a condenser which removes the unchanged ethanol, and containing 600 g. acetaldehyde/m.³, are introduced into a packed column, height 3 m., diameter 17.5 cm., at a rate of 3.3 m.³/hr., where they are scrubbed by 4.9 kg. acetic acid per hr. containing 0.2% by weight of sulphuric acid. The temperature in the column is kept at 16° C. by external cooling, the contact time being 53 sec. for the liquid. More than 97% by weight of the aldehyde in the gas is recovered. By using acetic acid alone only 65% by weight of the acetaldehyde could be recovered under the same conditions.

*Example 2.*—In a vessel which is provided with a stirrer and which contains a solution of acetaldehyde and 0.2% by weight of sulphuric acid in acetic acid, air is introduced while the temperature is maintained at 40°–100° C. At the same time the amount of acetaldehyde which is either oxidized, carried away by the waste gases or withdrawn together with the acid, is being replaced continuously. Part of the reaction liquid is continuously withdrawn from the reaction vessel and cooled down to about 25° C., so that the free acetaldehyde is polymerized to paraldehyde, and then fed into the top of a packed column, so that it flows in counter-current to the gases coming from the oxidation vessel, down to the said vessel. If the concentration of the acetaldehyde in the reaction liquid is kept at or below 10% by weight, 1 m.³ of the waste gases at the top of the reflux column carries away 60 g. acetaldehyde/m.³, whereas without the use of the polymerisation catalyst in the circulating solution, the gas carries away 300 g. acetaldehyde/m.³, i. e., a reduction of the losses to 1/5. With a 30% by weight solution of the aldehyde the corresponding figures are 110 g./m.³ and 700 g./m.³.

In this way the concentration of free acetaldehyde is at a minimum at the top of the scrubbing column, where the effluent gases meet the incoming cold circulated solution. Of course, the effect can be improved by variations in the rate of flow of the circulating solution and by additional cooling of the scrubber so that greater parts of the column are kept at a low temperature while the solution has enough time for the polymerisation of the acetaldehyde before it enters the top of the reaction vessel.

The surprising and unexpected effect of the new process is that, under the conditions mentioned in Example 2, the yields in acetic acid are excellent, though the inorganic acids are known as active condensation catalysts for acetaldehyde.

The oxidation of acetaldehyde can be carried out with or without the presence of special oxidation catalysts. It is essential, however, that the oxidation catalyst does not neutralize the activity of the depolymerising agent. Thus, advantageously, acidic or non-alkaline oxidation catalysts such as vanadic acid and metal salts of strong acids or complex acids can be used together with the strong acids above mentioned. Another catalyst, which makes it possible to use only moderate temperatures in the oxidation vessel, is manganic acid.

A modification of the process of Example 2 is the addition of the oxidation catalyst and of the polymerisation catalyst at different stages. Thus the oxidation catalyst, e. g., manganese acetate or copper acetate is added to the reaction vessel, whereas the depolymerising acid is added immediately before or after the solution is cooled. Thus it is possible to maintain in the hot reaction vessel a minimal concentration of the depolymerising acid, and at the same time to effect a sufficient polymerisation in the cool part of the circulating liquid (making use of the depolymerising effect of the high temperature).

The reaction vessel mentioned above can, of course, be replaced by a reaction tower, which may be packed or so designed that an interaction between the oxidizing gas and the liquid is easily possible. Such an oxidising tower may contain an upper part, used as a scrubbing column, which may be provided with means for indirect cooling.

Instead of the circulating solution, a cooled solution of the polymerising agent in acetic acid may be sprayed into the scrubbing column.

It is also possible to feed the scrubbing column with paraldehyde or with paraldehyde and acetic acid or with paraldehyde and another circulating solution, the amount of paraldehyde being preferably such as to replace the amount of acetaldehyde oxidised and withdrawn from the system. Such an arrangement is especially suitable in cases where acetic anhydride is to be produced by direct oxidation, an excess of paraldehyde acting as diluent.

In order to obtain the acetic acid from the reaction mixture, the latter is distilled so that acetaldeyde is removed as low boiling fraction. Or the reaction liquid may be distilled after the depolymerising acid has been neutralised, e. g. by sodium acetate. In this case, an azeotropic mixture consisting of equal parts of acetic acid and paraldehyde can be withdrawn as head fraction and returned to the oxidation, while, as a second fraction, pure acetic acid is obtained. If the reaction mixture contains any water, this can be removed during the distillation as an azeotropic mixture with paraldehyde at 89° C./760 mm. Hg, so that the resulting acetic acid is obtained water-free without resorting to a costly fractionation. We have also found that it is possible to obtain acetaldehyde alone from a reaction mixture in which the acidic depolymerising agent has been neutralised, if the distillation is conducted at a high reflux ratio, so that the greater time of contact between acetic acid and paraldehyde at the temperature in the distillation vessel is such as to cause a slow depolymerisation of the paraldehyde, even in the absence of a stronger acidic depolymerising agent.

The following description is of an alternative method of carrying out the above process in which the liquid solution containing paraldehyde obtained by washing out acetaldehyde vapour with the paraldehyde solvent containing the polymerising agent is distilled, after the polymerising agent has been neutralised, so as to isolate the paraldehyde in the usual manner. The paraldehyde thus isolated can then be returned to the reaction vessel together with a small amount of a depolymerising agent.

Paraldehyde can also be used instead of acetaldehyde for the manufacture of acetic acid in the following manner:

Paraldehyde, which is maintained at a temperature of about 30° C. and which contains a small amount of depolymerising agent has a stream of air passed through it so that the air carries away the evolved acetaldehyde vapour, the gaseous stream being led into an oxidation vessel where it is oxidised in the usual way with or without the addition of a depolymerising catalyst. The advantage of the use of paraldehyde instead of acetaldehyde in the vaporiser is, inter alia, that the saturation of the feed vapours can be more conveniently and accurately controlled. Preferably the air stream, after being passed through the paraldehyde, is led through a reflux condenser so that traces of paraldehyde carried over in the air stream may be returned to the saturator.

Alternatively, it is possible to pass the oxygen-containing gas through the solution recovered from the scrubbing unit, the solution being maintained at a suitable temperature so that acetaldehyde is regenerated and carried back with the stream of oxygen-containing gas into the oxidising vessel. In this process any difficulty arising from contact of a strongly acidic polymerising or depolymerising catalyst with the material of the oxidising vessel is avoided.

It will be appreciated that although the process for the recovery of acetaldehyde has been described as applied to oxidation processes, it may also be applied to any process in which it is required to recover acetaldehyde.

What we claim is:

1. A process for scrubbing acetaldehyde from a gaseous mixture containing it in admixture with at least one normally gaseous substance which comprises bringing the said gaseous mixture into intimate contact with acetic acid which contains in solution therein up to one-half of one per cent of an acidic polymerizing agent selected from the group consisting of sulphuric, phosphoric, and p-toluene sulphonic acids, capable of converting the acetaldehyde to paraldehyde, by passing the said gaseous mixture and acetic acid solution in countercurrent flow to each other, while maintaining the said solution at a temperature of 5° to 15° C., whereby absorption and polymerisation of the acetaldehyde take place.

2. A process for the removal of acetaldehyde from a gaseous mixture containing it in admixture with at least one normally gaseous substance which comprises introducing said gaseous mixture in countercurrent flow into an acetic acid solution of an acidic polymerising agent selected from the group consisting of sulphuric, phosphoric, and p-toluene sulphonic acids, said polymerising agent being present in an amount not exceeding 0.5% by weight of said acetic acid solution, maintaining said solution at a temperature of between 5° C. and 25° C. and recovering the paraldehde-containing solution.

3. A process for the removal of acetaldehyde from a gaseous mixture containing it in admixture with at least one normally gaseous substance which comprises introducing said gaseous mixture in countercurrent flow into an anhydrous acetic acid solution of an acidic polymerising agent selected from the group consisting of sulphuric, phosphoric, and p-toluene sulphonic acids, said polymerising agent being present in an amount not exceeding 0.5% by weight of said anhydrous acetic acid solution, maintaining said solution at a temperature of between 5° C. and 25° C. and recovering the paraldehyde-containing solution.

4. A process for the recovery of acetaldehyde from a gaseous mixture containing it in admixture with at least one normally gaseous substance which comprises introducing said gaseous mixture in countercurrent flow into an acetic acid solution of an acidic polymerising agent selected from the group consisting of sulphuric, phosphoric, and p-toluene sulphonic acids, said polymerising agent being present in an amount not exceeding 0.5% by weight of said acetic acid solution, maintaining said solution at a temperature of between 5° C. and 25° C., recovering the paraldehyde-containing solution thus produced, subjecting it to distillation to regenerate pure acetaldehyde and recovering said pure acetaldehyde as distillate.

5. A process for the removal of acetaldehyde from a gaseous mixture containing it in admixture with at least one normally gaseous substance which comprises introducing said gaseous mixture in countercurrent flow, with a contact time of from 30 to 60 seconds, into an anhydrous acetic acid solution of an acidic polymerising agent selected from the group consisting of sulphuric, phosphoric, and p-toluene sulphonic acids, said polymerising agent being present in an amount not exceeding 0.5% by weight of said anhydrous acetic acid solution, maintaining said solution at a temperature of between 5° C. and 25° C. and recovering the paraldehyde-containing solution.

6. A process for the removal of acetaldehyde from a gaseous mixture containing it in admixture with at least one normally gaseous substance which comprises introducing said gaseous mixture in countercurrent flow into an anhydrous acetic acid solution of sulphuric acid, the concentration of said sulphuric acid in said acetic acid being from 0.01% to 0.2% by weight thereof, maintaining said solution at a temperature of between 5° and 25° C. and recovering the paraldehyde-containing solution.

7. A process for the removal of acetaldehyde from a gaseous mixture containing it in admixture with at least one normally gaseous substance which comprises introducing said gaseous mixture in countercurrent flow into an anhydrous acetic acid solution of phospheric acid, the concentration of said phospheric acid in said acetic acid being from 0.01% to 0.2% by weight thereof, maintaining said solution at a temperature of between 5° and 25° C. and recovering the paraldehyde-containing solution.

8. A process for the removal of acetaldehyde from a gaseous mixture containing it in admixture with at least one normally gaseous substance which comprises introducing said gaseous mixture in countercurrent flow into an acetic acid solution of an acidic polymerising agent selected from the group consisting of sulphuric, phosphoric, and p-toluene sulphonic acids, said polymerising agent being present in an amount not exceeding 0.5% by weight of said acetic acid solution, maintaining said solution at a temperature of between 15° C. and 20° C. and recovering the paraldehyde-containing solution.

9. A process for removing acetaldehyde vapours from a gaseous mixture thereof with at least one normally gaseous substance and recovering it in a form from which it may be regenerated as acetaldehyde which comprises passing said gaseous mixture in countercurrent flow and in intimate contact with an organic solvent for acetaldehyde and paraldehyde which is inert towards said substances, said solvent being selected from the group consisting of acetic acid, paraldehyde, carbon tetrachloride and trichlorethylene and which solvent contains up to one-half of one percent of an acidic polymerising agent selected from the group consisting of sulphuric, phosphoric, and p-toluene sulphonic acids, for said acetaldehyde, maintaining the temperature of the solution between 5° C. and 25° C. and recovering the acid solution containing paraldehyde and acetaldehyde.

KARL HEINRICH WALTER TUERCK.
ERIC HARVEY BRITTAIN.

REFERENCES CITED

The following references are of record in the file of this patent:

UNITED STATES PATENTS

| Number | Name | Date |
|---|---|---|
| 1,300,451 | Morton | Apr. 15, 1919 |
| 1,306,963 | Koetschet et al. | June 17, 1919 |
| 1,400,205 | Backhaus et al. | Dec. 13, 1921 |
| 1,600,113 | Herman et al. | Sept. 14, 1926 |
| 1,677,730 | Sator | July 17, 1928 |
| 1,767,759 | Hermann et al. | June 24, 1930 |
| 1,951,789 | Muchler Conradi et al. | Mar. 20, 1934 |
| 1,956,440 | Fuchs | Apr. 24, 1934 |
| 1,994,714 | Johnson et al. | Mar. 19, 1935 |
| 2,068,010 | Dreyfus | Jan. 19, 1937 |
| 2,304,080 | Frank | Dec. 8, 1942 |
| 2,318,341 | Thompson | May 4, 1943 |
| 2,327,570 | Vogel | Aug. 24, 1943 |

FOREIGN PATENTS

| Number | Country | Date |
|---|---|---|
| 187,619 | Great Britain | May 24, 1923 |

OTHER REFERENCES

Karrer-Organic Chemistry (1938), Nordeman Pub. Co., N. Y., page 149.